US008725205B2

(12) United States Patent
Ryan (10) Patent No.: US 8,725,205 B2
(45) Date of Patent: May 13, 2014

(54) COMPUTING DEVICE WITH REMOVABLE PROCESSING UNIT

(75) Inventor: Mark Ryan, McMinnville, OR (US)

(73) Assignee: Communications Enhancement Products, Inc., Las Vegas, NV (US)

( * ) Notice: Subject to any disclaimer, the term of this patent is extended or adjusted under 35 U.S.C. 154(b) by 51 days.

(21) Appl. No.: 13/065,193

(22) Filed: Mar. 15, 2011

(65) Prior Publication Data

US 2011/0256905 A1 Oct. 20, 2011

Related U.S. Application Data

(60) Provisional application No. 61/325,818, filed on Apr. 20, 2010.

(51) Int. Cl.
*H04M 1/00* (2006.01)

(52) U.S. Cl.
USPC .............. 455/556.1; 455/556.2; 455/557; 455/558

(58) Field of Classification Search
USPC ............... 455/556.1, 556.2, 557–559
See application file for complete search history.

(56) References Cited

U.S. PATENT DOCUMENTS

| 7,330,737 | B2 | 2/2008 | Mahini |
| 2004/0019724 | A1* | 1/2004 | Singleton et al. ............. 710/303 |
| 2008/0126661 | A1* | 5/2008 | Lin et al. ........................ 710/304 |
| 2008/0160974 | A1* | 7/2008 | Vartiainen et al. .......... 455/414.3 |
| 2008/0316177 | A1* | 12/2008 | Tseng ............................ 345/168 |
| 2009/0143102 | A1* | 6/2009 | Umemura et al. ............. 455/557 |
| 2009/0209287 | A1* | 8/2009 | Ravelo ........................ 455/556.1 |
| 2010/0251292 | A1* | 9/2010 | Srinivasan et al. .............. 725/37 |
| 2010/0260350 | A1* | 10/2010 | Chutorash et al. ............... 381/86 |
| 2011/0021247 | A1 | 1/2011 | Shih |

* cited by examiner

*Primary Examiner* — Wayne Cai (74) *Attorney, Agent, or Firm* — Galvin Patent Law LLC; Brian R. Galvin (57) ABSTRACT

A computing device comprises a plurality of user interface elements, a first communications link software module, and a removable processing unit comprising at least a processor module, a data storage module, and a second communications link software module. According to the embodiment, the first communications link software module and the second communications link software module are adapted to exchange digital information between the user interface elements and the removable processing unit, and when the first and second communications link software modules are exchanging digital information, user actions taken via the plurality of user interface elements are carried out by software operating on the removable processing unit.

3 Claims, 6 Drawing Sheets

COMPUTING DEVICE WITH REMOVABLE PROCESSING UNIT

CROSS-REFERENCE TO RELATED APPLICATIONS

This application claims priority to U.S. Provisional Patent Application Ser. No. 61/325,818, filed on Apr. 20, 2010, titled "Electronic Device for Providing External Access to Smartphone's Services", the contents of which are hereby incorporated by reference in their entirety.

BACKGROUND OF THE INVENTION

1. Field of the Invention

The present invention is in the field of computing devices, and more particularly to the field of mobile computing devices such as laptops, smart phones, and "netbooks".

2. Discussion of the State of the Art

In recent years, there has been a remarkable growth in the use and capability of mobile telephones and other handheld electronic devices. Where only twenty years ago mobile telephones tended be large, heavy devices of great cost and one function (making and receiving telephone calls while away from one's normal "land line" telephones), today mobile telephones are general-purpose computers with more power than a high-end workstation would have had twenty years ago. Well-known mobile operating systems abound, and the most successful were all created within just the last few years (for example, Android from Google, iOS from Apple, and Windows Phone 7 from Microsoft), principally because the first several generations were designed primarily as operating systems for telephones.

To understand how singularly transformational the changes in mobile telephony have been, consider that a mainstream mobile telephony device today is equipped with satellite navigation via the global positioning system (GPS) deployed by the United States, as well as accelerometers to detect motion and physical orientation of the device, considerable solid-state storage capacity, high-quality audio systems, long battery life, excellent radio capabilities, fast central processor units, and touch-screen interfaces. None of these features were available even ten years ago. As a result of the impressive power of modern mobile telephones, a very large number of third-party applications have been developed in the last five years that have enjoyed impressive commercial success, and entire industries have emerged along with them (for instance, the mobile gaming software industry).

Inevitably, attention has been paid during these recent years to various forms of integration between mobile telephone devices and computers. The Canadian company Research in Motion created the successful Blackberry™ line of products, which added email and web browsing capabilities to a high-end mobile telephone device and were an instant success. These devices are shipped with universal serial bus (USB) cable to allow them to be connected directly to a user's desktop or laptop personal computer, allowing for synchronization of email between the two devices. Initially, Blackberry devices (and their imitators) were primarily used as phones that also allowed their users to check email while away from their desks; there was no notion of the Blackberry being a principal computing device, as the interface was too difficult and the processing power was not adequate for such purposes. Another early integration between mobile telephony and personal computing that was quickly adopted was the concept of tethering a computer to a mobile phone in order to provide Internet connectivity to the computer while it was away from a physical (wire) network connection. In some cases, a phone such as a Blackberry was connected (again generally via a cable provided with the phone) to a laptop, and then acted as an external modem, providing connectivity to the laptop via the cellular phone network. Later, phone companies and other market entrants began selling special purpose cards that could be inserted into a standard PCM-CIA card slot in a laptop and that were equipped with radio circuitry to allow them to join a wireless telephony network (appearing to the network as a mobile phone), in order to provide data connectivity from the laptop to the Internet via the wireless network. These integrations served to make laptop computers (and later "netbooks", which took on an even smaller form factor than laptops) more connected when away from their home locations, by giving them the ability to connect via a nearly-ubiquitous mobile telephony infrastructure in developed countries. However, with few exceptions (people who chose to use Internet telephony directly from their computers), users still carried a mobile phone (later generations of which have been referred to as "smart phones", which term will be used herein to refer to a mobile telephony device with a computer-like operating system, substantial data storage, and the ability to execute applications normally associated with computers more than telephony, using text-based and graphical user interfaces) and a laptop or netbook computer; the former was used primarily for communications, and the latter for computing.

Even more recently, the capabilities of the processors inside mobile telephones have surged to the point that smart phones are now used as de facto computers by many consumers. There are, as of the last year before filing of this application, a number of smart phones on the market with dual core central processing modules, often more than 100 gigabytes of fast, solid-state data storage, and high-speed data connections via either WiFi hotspots or wireless telephony networks (and generally both). This has resulted in some early attempts to accommodate use of smart phones as full-featured computers, for instance by allowing a smart phone connected to a laptop via a USB cable to directly access resources on the laptop, and in another example by providing a smart phone docking station with USB ports so that an external monitor or keyboard, or both, can be used to provide a more usable interface means while leveraging the smart phone as the computer. Similarly, in some cases use of a short-range protocol technology such as Bluetooth™ has allowed connections between smart phones and Bluetooth™ keyboards and other peripherals.

However, for two reasons the natural next step in the convergence of mobile communications and mobile computing has not been taken heretofore. The first reason is that smart phones are still quite new, and have filled new market niches and use cases, and in general have not been viewed as displacing laptops or other personal computing devices. Most users of personal computing devices have developed a range of uses for smart phones, but still use their laptops and personal computers as their main computing device (in fact, it is only in the last few years that laptops have themselves come to be seen as having sufficient computing resources to eliminate the need for a separate desktop personal computer). The second reason is that smart phones have not been considered to have anything like the computing power needed to handle mainstream computing tasks, which of course underscored the relevance of the first reason, which can be summarized as "habit of the marketplace". Today, smart phones are considered to be powerful phones with low-end computing capabilities that fill a completely distinct new set of needs, and not as the future replacement for laptops, in most vendors' and users' minds.

This disjunction between mobile computing and mobile communications means that most business and mobile consumer users will still use a smart phone (or two), perhaps a tablet device such as Apple's iPad™, and a powerful laptop computer; many users are just now adopting the "modern" notion of doing away with the desktop personal computer. This disjunction has a cost, however, in that users must continually struggle with synchronization issues. Files that are downloaded onto one device are not necessarily synchronized with a user's other devices, and keeping emails synchronized between one's various devices can be challenging. The same problem arises with music collections, videos, photos, and so forth. Many ingenious techniques have been developed to address these issues, most of which rely on various cloud-based, or network-resident, services that provide automatic synchronization across multiple devices. While these services are quite valuable (functionally and financially), they generally each address only a subset of the overall problem, and still have drawbacks (for instance, not all devices are connected all the time yet, so there will always be windows of time when devices are unsynchronized).

What is needed is a clear convergence of two very large streams of technology that are at last ready for it: telecommunications and computing. Modern smartphones are already sufficiently powerful to serve as functional full-featured computing devices in their own right. While they have impressive communications capabilities, of course, they end to be somewhat balky as user interfaces for many computing tasks. For instance, editing a complex business spreadsheet is not easy on the small real estate of a smart phone. On the other hand, it is likely that laptops will never replace smart phones as communications devices, because frequently one wants to communicate when it is inconvenient to have a laptop open and a headset on. What is desirable is to have the convenience of a large screen, a touchpad, and easy connection of a large variety of peripheral devices, and the powerful communications capabilities of a smart phone, all available "at hand" when needed, with no synchronization problems to deal with.

It is an object of the present invention, therefore, to provide a solution to this convergence problem by describing a computing device with a removable processing unit, and teaching various embodiments to illustrate how such a device addresses the problems just described.

SUMMARY OF THE INVENTION

In a preferred embodiment of the invention, a computing device comprises a plurality of user interface elements, a first communications link software module, and a removable processing unit comprising at least a processor module, a data storage module, and a second communications link software module, is disclosed. According to the embodiment, the first communications link software module and the second communications link software module are adapted to exchange digital information between the user interface elements and the removable processing unit, and when the first and second communications link software modules are exchanging digital information, user actions taken via the plurality of user interface elements are carried out by software operating on the removable processing unit.

In another preferred embodiment of the invention, the removable processing unit is a handheld computing device. In yet another preferred embodiment of the invention, the handheld computing device is a mobile phone. In a further preferred embodiment of the invention, the mobile phone is a smart phone.

In another preferred embodiment of the invention, the removable processing unit comprises a first docking port and the computing device comprises a second docking port adapted to join with the first docking port, and the first and second communications link software modules communicate via an electronic connection established by the joined first and second docking ports.

In a further preferred embodiment of the invention, the smart phone comprises a first docking port and the computing device comprises a second docking port adapted to join with the first docking port; and wherein the first and second communications link software modules communicate via an electronic connection established by the joined first and second docking ports. In yet another preferred embodiment of the invention, when the first and second docking ports are joined, the smart phone acts as a trackpad user interface element for the computing device.

According to another preferred embodiment of the invention, substantially all user-specific information used by the computing device is stored on the removable processor unit.

In a further embodiment, the computing device with the smart phone connected is as a laptop computer with primary processing carried out in the smart phone. In another embodiment, the computing device is an automotive dashboard, and the smart phone, when connected, comprises a software module that enables a user to control at least an entertainment or a navigational subsystem of the automobile. In yet another embodiment, the computing device is a digital television. In yet another embodiment, the computing device is a kiosk.

In a preferred embodiment, the smart phone further comprises a removable processor card, the removable processor card containing at least an operating system and user-specific data.

DETAILED DESCRIPTION

Figure 1:
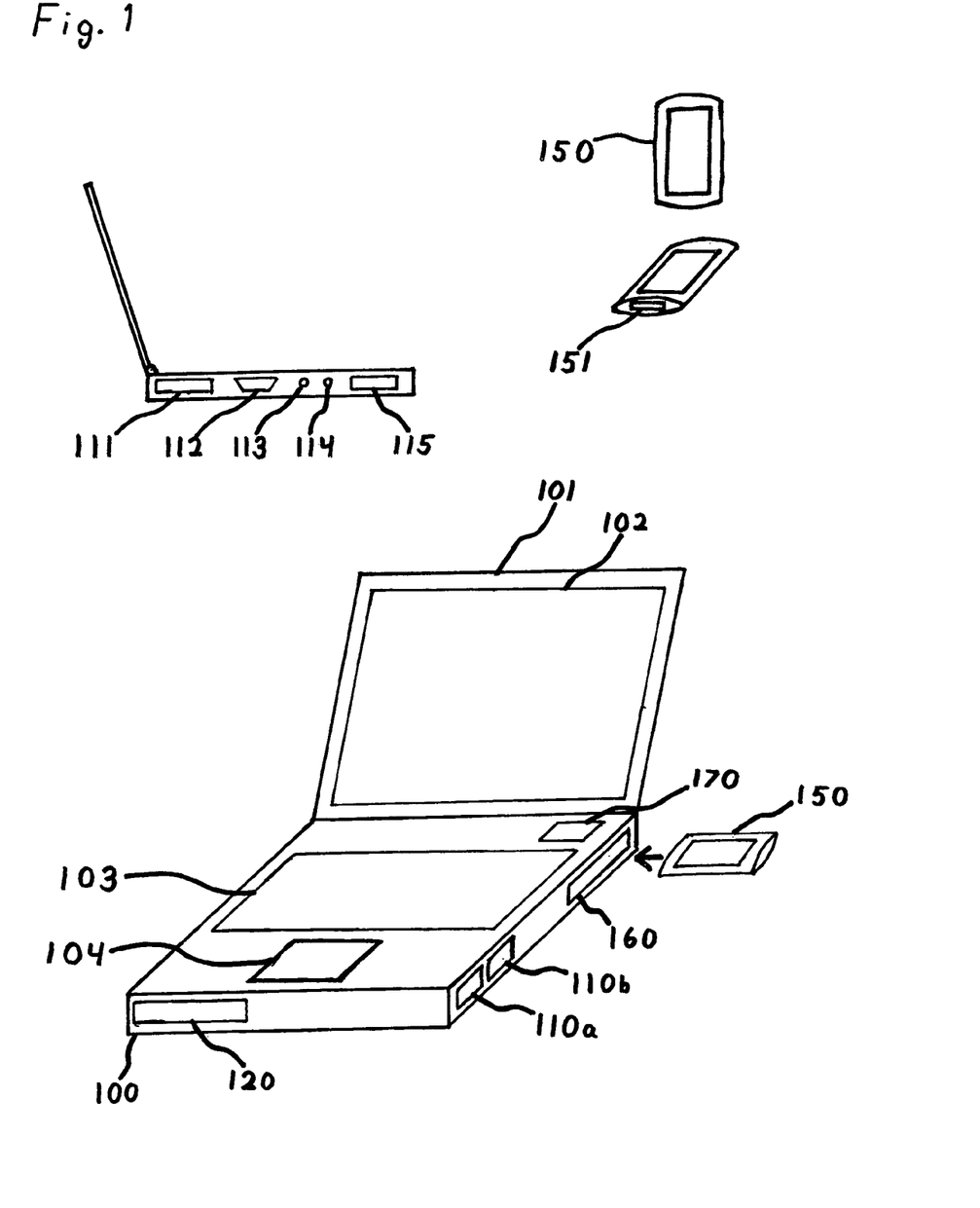
FIG. 1 provides an illustration of a preferred embodiment of the invention in which a handheld computing device is inserted into a docking slot in the side of a larger computing device.

In a preferred embodiment, a computing device with removable processing unit is disclosed. With reference to FIG. 1, computing device 100 is a device with the external appearance and functionality of a typical laptop computer. For example, several optional periperhal devices can be installed integrally as part of computing device 100, such as DVD drive 120, keyboard 103, touch pad 104 for navigation, a large screen 102 for easy visibility (and generally built in to a closeable cover or top 101 as is common among laptops), and one or more universal serial bus (USB) ports 110a, 110b. Shown in a different perspective are peripheral device interfaces that in this embodiment are shown on a left side of computing device 100, including a conventional network cable adapter 111 such as an RJ45 Ethernet adapter, a video graphics array (VGA) or equivalent external monitor connection 112, a plug for connecting headphones 113 and a microphone 114 (although speakers and microphones may also, or alternatively, be built integrally into computing device 100, as is well known in the art of laptop design), and an optional slot 115 configured with a PCM-CIA card adapter, a memory card adapter, or any other peripheral connection adapter known in the art. None of the elements just described is new in the art of laptop design and manufacturing, and are listed primarily to illustrate that computing device 100 can be thought of as a fully-functional laptop-like device (that is, it could be a netbook or a tablet computer as well, without departing from the spirit of the invention).

What is new is the use made of, and interconnection with, smart phone 150. The term "smart phone" is used herein to refer to any generally hand-held computing device that is equipped to act as a fully-functional mobile telephone as well. However, smart phone 150 is merely an exemplary embodiment; a non-telephony-capable handheld device could also be used instead of a smart phone 150 without departing from the scope of the invention. In a significant departure from the laptop-connected smart phone approaches used in the art and described in the background section of this application, computing device 100 actually relies on smart phone 150 (again, for emphasis, this is merely exemplary; computing device 100 could also use a handheld computing device 150 that is not a telephone, for the same purpose and to the same effect, according to the invention) to act as its central processing unit and permanent primary data store. Smart phone 150 is, like most smart phones, equipped with a docking port 151, and computing device 100 has a smart phone docking slot 160. In a normal operating mode, smart phone 150 is inserted into smart phone docking slot 160 such that docking port 151 is fully engaged with an docking port internal to smart phone docking slot 160 (smart phone docking interfaces come in several standard types in the art, any of which may be used, or indeed any new type could also be used, as the invention assumes a docking slot type and many are well-known in the art). When inserted, smart phone 150 fits such that its "top" (the end opposite docking port 151) is substantially flush with the side of computing device 100 for carrying convenience. It should be noted, however, that this is just an expected design choice based on providing a natural form factor, but it is not a functional requirement according to the invention; a portion of smart phone 150 could protrude from a side of computing device 100, or be recessed into a side of computing device 100, without departing from the scope of the invention.

While details of representative internal communications between computing device 100 and smart phone 150 are provided below, it will be useful to describe the high-level functionality provided by each of them in their base, docked state. Unlike conventional laptops or netbooks, computing device 100 only functions as a computer when smart phone 150 is docked. Furthermore, while it is possible according to the invention to have additional data storage capacity integral to computing device 100, in general the core data storage subsystem of the combined system (that is the system of smart phone 150 docked in computing device 100) is contained on smart phone 150. According to some embodiments of the invention, smart phone 150 can be "hot-docked", or docked into smart phone docking slot 160 while running, whereupon smart phone 150 causes screen 102 to display the same or a similar screen to what was displayed on smart phone 150 just before it was docked. In some embodiments, a special "docking mode menu" screen is displayed when an operating smart phone 150 is docked, to allow a user to make selections concerning how she wants to interact with the combined computing device 100, and how she wants the smart phone 150 screen to be displayed on screen 102. Optionally, smart phone 150 can be docked while shut down, and then both computing device 100 and smart phone 150 can be started simultaneously using power button 170. Similarly, power button 170 can be used to power down the combined devices. If computing device 100 is off when an operating smart phone 150 is docked, computing device may either start up automatically, or remain shut down until power button 170 is pressed; either mode may be used according to the invention and in most cases a user will be allowed to configure which behavior to use.

When smart phone 150 is docked in computing device 100 and both devices are on, smart phone 150 acts essentially as if it is the "brain" of computing device 100. The operating system of smart phone 150 drives the particular components of computing device 100, and in particular the applications and interfaces used on smart phone 150 are available on computing device 100 when an operating smart phone 150 or equivalent handheld computing device is docked. In some embodiments of the invention, screen 102 is used to display augmented user interface screens designed to take advantage of the larger form factor of screen 102 compared to smart phone 150, although in some embodiments it may be desirable to simply have screen 102 display identical user interface elements as would be seen on smart phone 150 when undocked; such an approach demands less of a user, and can be particularly effective if enhanced screen resolution (typically present in a large laptop-like screen compared to a handheld-device's screen) is used to make the same user interface elements appear but with finer resolution. In some embodiments, smart phone 150 will be configured so that, when docked, a default screen of a full web browser is displayed on screen 102. In another exemplary embodiment, computing device 100 is provided with a modest computing capability suitable for operating a web browser, and thus can be used as a very basic network-attached computer when smart phone 150 is undocked; in this case, however, any cookies or other browser history data stored by computing device 100 while operating independently would be automatically uploaded to smart phone 150 when docking occurs, to avoid any need for user attention to synchronization tasks.

It will be appreciated that the combination of computing device 100 and smart phone 150 just described with reference to FIG. 1 is, in effect, a laptop computer with a "removable brain". The "removable brain" (smart phone 150) is normally also a full-featured smart phone 150, although as previously noted it could be any other handheld computing device properly prepared for use in conjunction with computing device 100. There is an important distinction between systems known in the art, such as those where a mobile phone can be tethered to a laptop, and the instant invention. The distinction is that, in the art, interaction between standalone mobile device and standalone computers has been enabled as described in the background section, but users are still forced to carry two separate, independent devices (generally from different manufacturers, and generally with different operating systems), and users have to take care to synchronize each of the many types of data that might usefully be exchanged between the devices (for instance, email, movies, music, documents, cookies, and so forth). And, many forms of integration require additional cables and adapters to be carried by a user, especially if a user wishes to use a mobile phone for providing data connectivity to a laptop. According to the invention, these drawbacks are eliminated because there is only one "system of record"; when a user finishes interacting with their "laptop", by which in this example is meant computing device 100 with smart phone 150 docked and controlling it, she can just undock the smart phone, close the laptop (not necessarily in that order), and leave the laptop behind—and everything that has been done in the previous computing session is contained in smart phone 150 which can be dropped in a purse, pocket, or other location on a user's person. Thus, according to the invention, a user interacts with only one "computer", and the computer acts as a normal laptop (computing device 100 with smart phone 150 docked) or a normal (high-end) smart phone (smart phone 150 undocked), without any user action other than docking or undocking the smart phone 150. There is no need for synchronization, since there is only one "brain"—one processor, and one main data store, one operating system, and one set of applications—and it is the smart phone 150.

Figures 2, 2A:
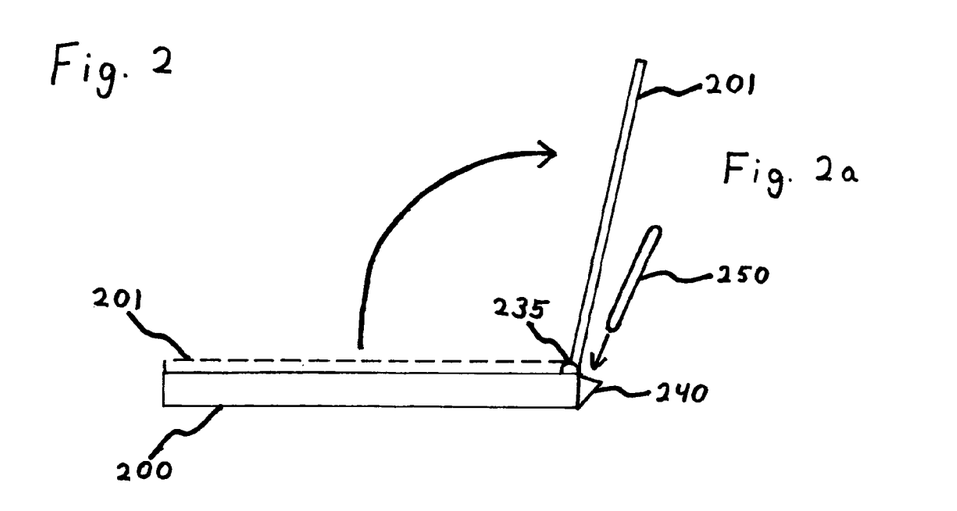
FIG. 2 provides an illustration of preferred embodiments of the invention in which a handheld computing device is snapped into a docking slot on the top of a larger computing device's base.
Figure 2B:
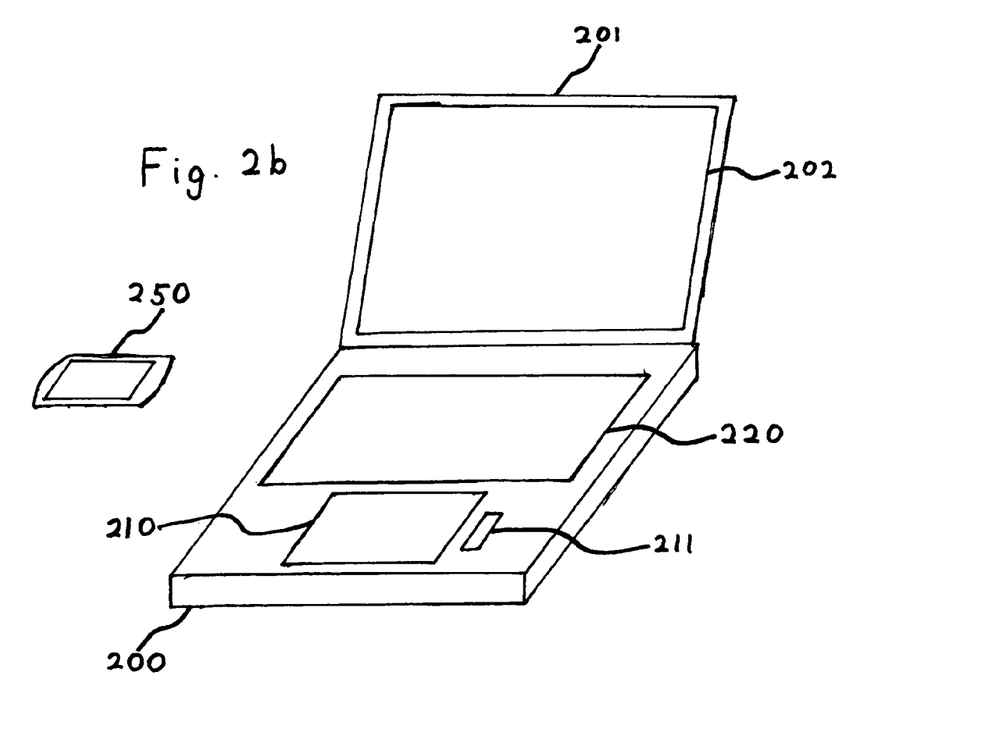

FIG. 2 shows additional preferred embodiments of the invention. Again, as in the previous discussion pertaining to FIG. 1, computing device 200 is a laptop-like device with closeable lid portion 201, screen 202, and keyboard 220. Peripheral attachment points and power switch are not shown, although they are usually present; since they are shown in FIG. 1 and described with reference thereto, there is no need to show them in FIG. 2, which is intended to show additional means, according to the invention, for interfacing smart phone 250 and computing device 200. In FIG. 2a, docking station 240 is mounted on a rear side of computing device 200, just behind hinge 235, which acts as a point of rotation for moveable lid portion 201, and arranged so that moveable lid portion 201, when fully open, allows space adequate for insertion of smart phone 250, which in all respects performs the same functions with respect to computing device 200 as described with reference to smart phone 150 and computing device 100. In another preferred embodiment, shown in FIG. 2b, docking station 210 is placed on the upper face of the base of computing device 200, just forward of keyboard 220, in order to allow smart phone 250 to be inserted and snapped in, much as memory cards and SIM cards are often removably placed in smart phones in the art. In order to undock smart phone 250, push button 211 or equivalent mechanism is provided. One advantage of the respective arrangement of computing device 200 and smart phone 250 is that it allows smart phones equipped with touch-sensitive screens to be used, when docked, as a built-in trackpad for computing device 200.

Figure 3:
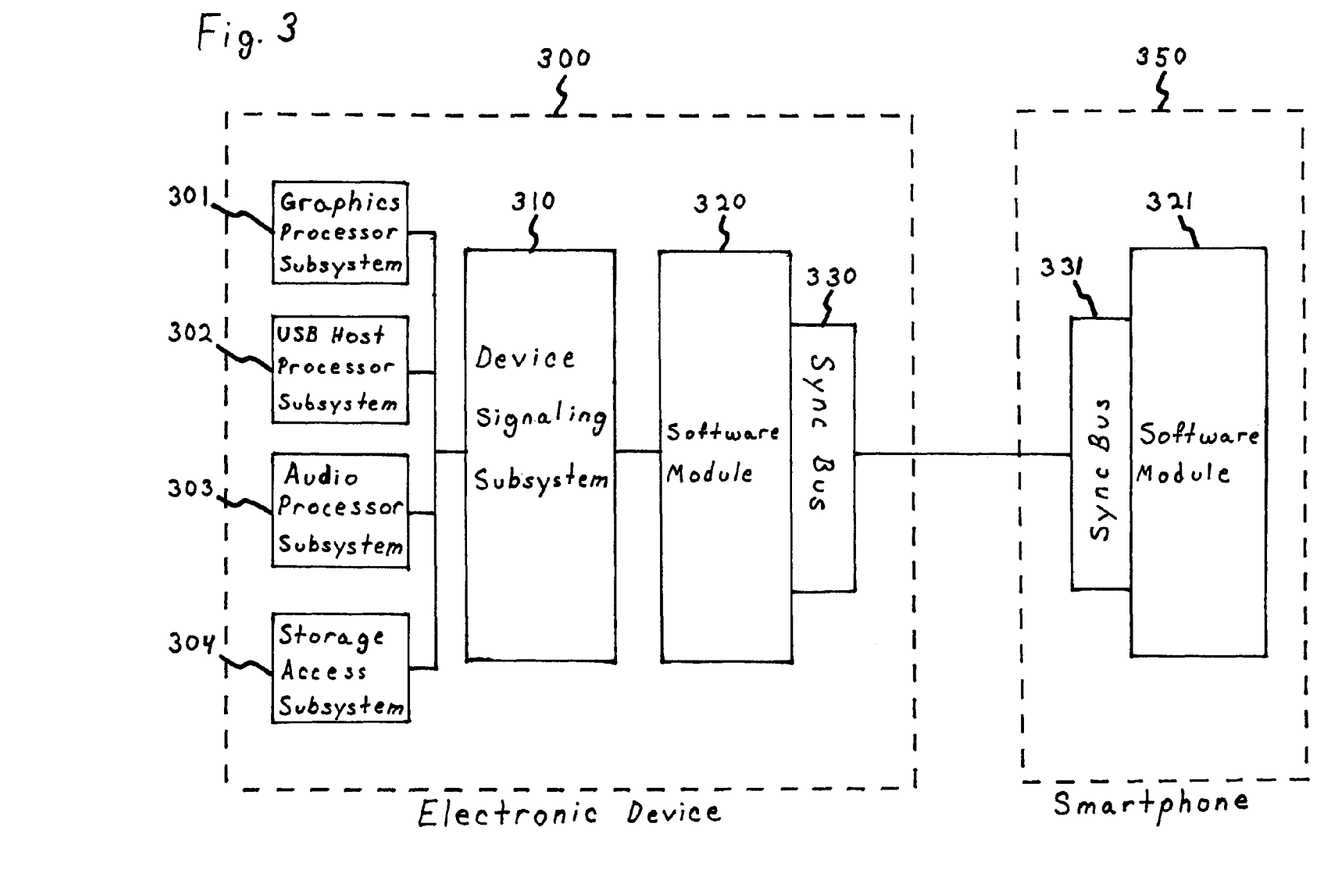
FIG. 3 is a block diagram of representative internal modules of a pair of computing devices, one of which is a handheld computing device, according to an embodiment of the invention.

FIG. 3 provides a logical diagram illustrating relationships between certain key functional modules in computing device 300 and smart phone 350 (which again can be any handheld computing device configured according to the invention). In a preferred embodiment, computing device 300 incorporates a keyboard and a display screen, which will mimic corresponding services on smart phone 350. Computing device 300 includes a battery as well as a jack for connecting the device to an external A/C power adapter. Computing device 300 includes means to support an external display device, an external keyboard and various external storage devices including, but not limited to, USB-connected storage devices or memory cards conforming to one or more industry standards (for example, SD or MMC layout). Computing device 300 connects to smart phone 350 through an electronic interface such as a docking station with conducting pins, through which communications to and from smart phone 350 are carried.

According to the embodiment, when docked smart phone 350 is the primary source for all signaling which operates smart phone 350. Computing device 300 serves as an external source of signaling, with signals passed along to docked smart phone 350 and acted upon by smartphone. Corresponding changes to screen content on smart phone 350 are passed to computing device 300 for display on the included screen display 202 as well as to any external display connected through an included external display port included on computing device 300.

The docking port 160, 240, 210 that connects smart phone 350 to computing device 300 serves as a conduit through which signaling is passed. A communications link software module 321 loaded on smart phone 350 communicates with a corresponding communications link software module 320 loaded on computing device 300 and these two software modules, in combination, serve as a primary source of signaling between the devices. It is through these two communications link software modules 320, 321 that control of smart phone 350 is extended to computing device 300 to which smart phone 350 is docked.

The hardware located in computing device 300 comprises various service modules or subsystems, each designed to provide access to and control of specific functions. As shown in FIG. 3, communications link software modules 320, 321 serve as gatekeepers for all signaling passing between computing device 300 and smart phone 350. For example, there may be separate processor subsystems to provide electronic connections to graphics display services 301, USB host bus services 302, audio processing services 303, and storage access services 304. Each of these services provides local device control of the associated service. A device signaling subsystem 310 connects to the various processor subsystems and serves as switchboard to interpreting all signaling passing across communications link software module 320 loaded on computing device 300.

Through these subsystems, key presses occurring on computing device 300 are passed along to smart phone 350 where they are interpreted as local key presses. Sounds generated on smart phone 350 are relayed through the communications link where they are interpreted by audio processor subsystem 303 and sent to speakers or to a headset connected to computing device 300. Data storage devices connected to computing device 300 are controlled by storage access subsystem 304 and appear as external storage to smart phone 350. It should be noted that the various subsystems described in FIG. 3 are in general built using techniques well-established in the art. Computing devices 300 already have audio subsystems 303 and so forth, and they already are able to communicate with smart phones 350 using USB cables for example. But in the art, smart phone 350 is generally treated as a peripheral device with which data synchronization is performed when the devices are connected, except in the case where smart phone 350 is used as a tethered de facto modem to provide Internet connectivity to computing device 300 via a mobile telephony network (using the radio in smart phone 350).

Communications between smart phone 350 and computing device 300, performed via sync bus 300 between communications link software modules 320 and 321, may be conducted using any number of protocols known in the art, or new protocols that may emerge in the future; the inventive conception is not tied to the precise format of communications, but rather to the respective roles of computing device 300 and smart phone 350, which are new. Accordingly, communications over sync bus 330 can be via web services, direct API interfaces using a mechanism such as Java Remote Procedure Calls, or even binary data exchange. For example, computing device 300 could in an embodiment be provided with a minimal standalone computing capability sufficient to allow it, standing alone, to operate as a web browser, connecting to the Internet for instance via an Ethernet cable through port 111. In this embodiment, smart phone 350 could be configured to act as a web proxy server for computing device 300, and user interactions with computing device 300 would be done through the built-in browser. When smart phone 350 is undocked, only browsing of basic web pages would be possible on computing device 300, but when smart phone 350 is docked it provides much richer capabilities, including for example working with documents stored on smart phone 350, said capabilities still accessed, though, through a web browser.

Figure 4:
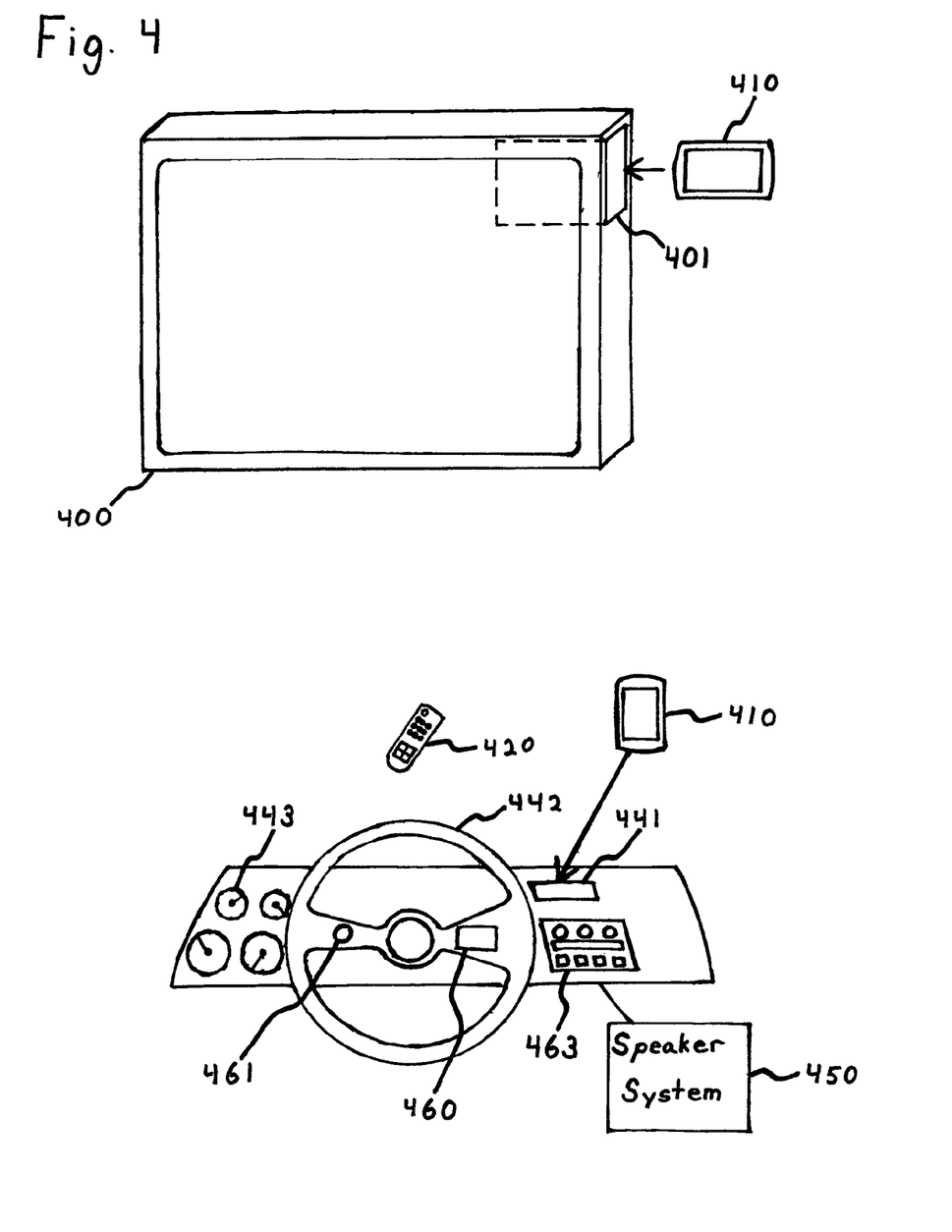
FIG. 4 provides an illustration of additional alternative embodiments of the invention FIG. 5 provides an illustration of an alternative embodiment of the invention.

FIG. 4 illustrates alternative embodiments of the invention, in which smart phone 410 is used as a "removable brain" for quite different computing devices. In one embodiment, digital television 400 is equipped with a smart phone docking slot 401 to allow insertion of smart phone 410. When docked, television 400 acts as a computer with smart phone 410 acting as its operating system and central processing unit. For example, according to the embodiment, television 400 could be treated within smart phone 410 as a smart peripheral, and normal television functions would be enabled under control of an application resident and operating on smart phone 410. Television 400 might be equipped with digital video recording capability or even simply a large data storage element, so that movies and other multimedia content could be recorded from live television or downloaded from the Internet and then played on the television. When smart phone 410 is docked, it can be controlled by remote control 420, or by a wireless keyboard and mouse, and television 400 acts as a large video monitor for smart phone 410. When a user decides to leave, she can just undock smart phone 410 and take it with her, and any documents, emails, or multimedia files she had modified or downloaded would be there without any action required.

In another embodiment, automobile dashboard 440 with typical gages 443, steering wheel 442, and so forth, is equipped with smart phone docking slot 441, which allows smart phone 410 to be docked in similar fashion to computing devices 100, 200, 300 and television 400 in previous embodiments. While it is not suggested that smart phone 410 would provide an operating system for the automobile managed by a driver sitting at dashboard 440 (although this is actually possible, it might not be desirable from a safety point of view), it would be typical to have smart phone provide a full range of in-car entertainment and communications applications. With analogous interface circuitry such as was described with reference to FIG. 3, smart phone 410 could drive audio through speakers 450 and microphone 461, and could provide a visual touch-sensitive interface using touch screen panel 463, embedded in dashboard 440. Alternatively or additionally, simplified touch-sensitive controls 460 can be provided on the steering wheel. Since many smart phones 410 now have rich geolocation feature sets typically based on GPS and advanced mapping software, it is possible to have smart phone 410 provide a fully functional set of navigational applications as well as full multimedia communications, and automotive manufacturers could write smart phone applications designed to provide for user-friendly climate and fuel efficiency decision-making. Moreover, since smart phones 410 could be swapped out when different drivers are in the car (since normally each person would have her own smart phone 410), it is possible to have individual preferences set and stored on smart phone 410 and transferred with the associated driver from automobile to automobile. Obviously, different makes and models of automobiles would expose different types and amounts of functionality, but since each smart phone 410 could store a local data file for each car typically driven by the owner of the phone, there is no difficulty in achieving driver preference portability.

The two examples shown here in FIG. 4 are typical of the variety of ways envisioned by the inventor for using the invention of providing computing devices with "removable brains". Since individuals usually only have one personal smart phone, and are accustomed to taking it everywhere they go, for the first time in history it is possible for users to have their "electronic selves" follow them around and seamlessly integrate into a variety of consumer electronic devices, instantly transforming said devices into highly-personalized, powerfully capable computing devices. Many other examples are possible, according to the invention. For example, a smart phone docking slot can be provided as a feature in a refrigerator equipped with a touch-screen interface unit on a front surface of one or more doors. In such an exemplary embodiment, a smart phone according to the invention could be inserted into the refrigerator in the morning as a routine, and automatically receive updates to shopping lists, errands lists, or to do lists, so that when a user removes the smart phone to go about the user's daily routine, their smart phone, acting as a sort of "personal brain", is fully updated and available to provide prompts during the day based on location and activities. For example, if the user were to pass a grocery store known (by the smart phone) to be used by and familiar to the user, the smart phone could provide an audible alert and a visible message on its front face advising the user to "pick up milk". Or, when a user inserts her smart phone according to the invention into a kiosk while at a mall, the smart phone could automatically be updated with personalized offers. Of course, this capability can also be provided wirelessly using Bluetooth. Regardless of internetworking mode used (docking station, Bluetooth, short-range WiFi, or something new), what is possible according to the invention is not only data exchange but actual control. The user could look up information and perform computing tasks via a kiosk, using personal information such as credit card numbers, personal identification numbers, and personal preferences, to quickly accomplish a variety of tasks. Kiosk vendors, and retailers using kiosks, would have strong incentives to make rich interface capabilities (such as a large, touch-sensitive active advertisement sign) available to users, allowing those capabilities to be used under control of each user's smart phone (acting as a "portable personal brain"). The incentives arise because of the richness of information sharing that necessarily takes place; when users can accomplish many tasks in a convenient, intuitive, and personalized way, vendors receive very valuable information about the users and can make more appropriate offers and provide more appropriate services.

Figure 5:
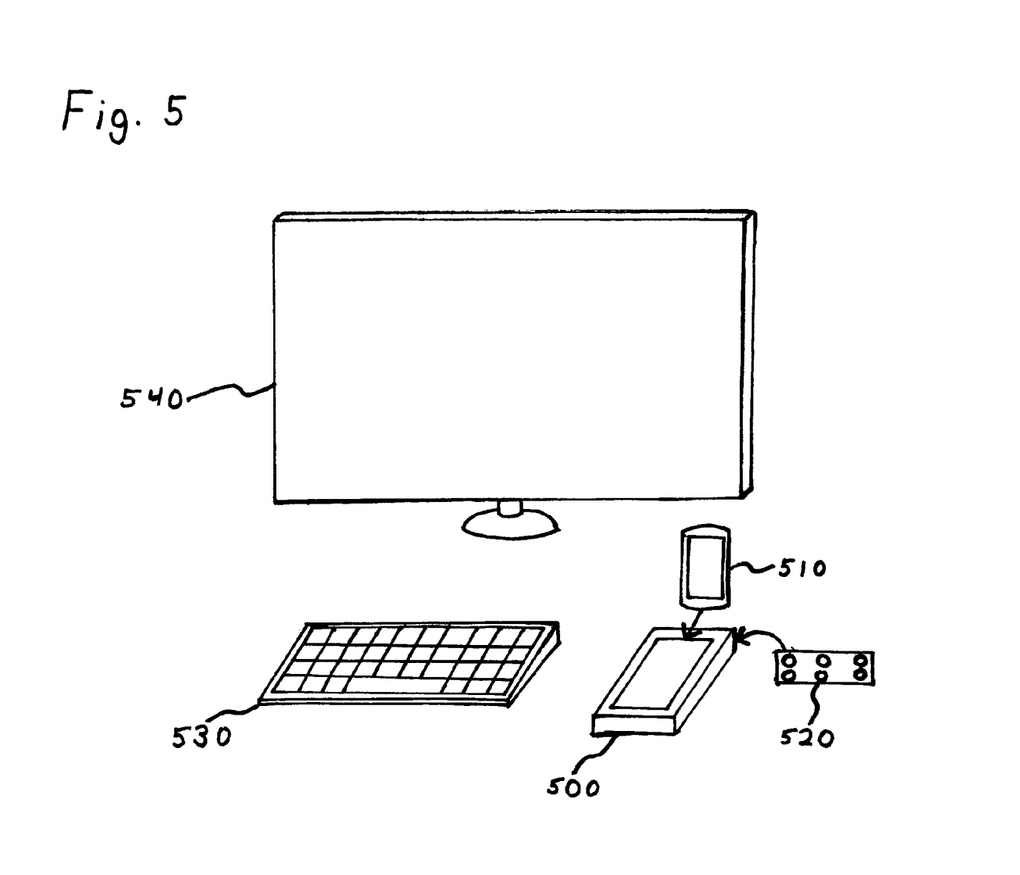

As another exemplary embodiment that shows the power of the concept, FIG. 5 illustrates a small rectangular computing device 500 that acts as a simple smart phone docking station. Computing device 500 may be equipped, for example on a rear face, with a plurality of USB or other data ports 520, and it may also be equipped with Bluetooth™ or other short- or medium-range wireless capabilities. For example, computing device 500 could be equipped with WiFi capability so that smart phone 510, when docked, could be in "airplane mode" when desired (that is, not radiating), and simply access the Internet via a WiFi router located nearby. Additionally, Bluetooth™ capability could enable computing device 500 to control television or video monitor 540 and keyboard 530. As mentioned before, most recently-released smart phones 510 have touch-sensitive screens on them as a powerful user interface element; when these smart phones 510 are docked into computing device 500, they become not only the "removable brain" of the system but also the high-performance trackpad. Thus FIG. 5 shows how smart phones can act as removable brains for what are, in effect, powerful desktop computers.

Figure 6:
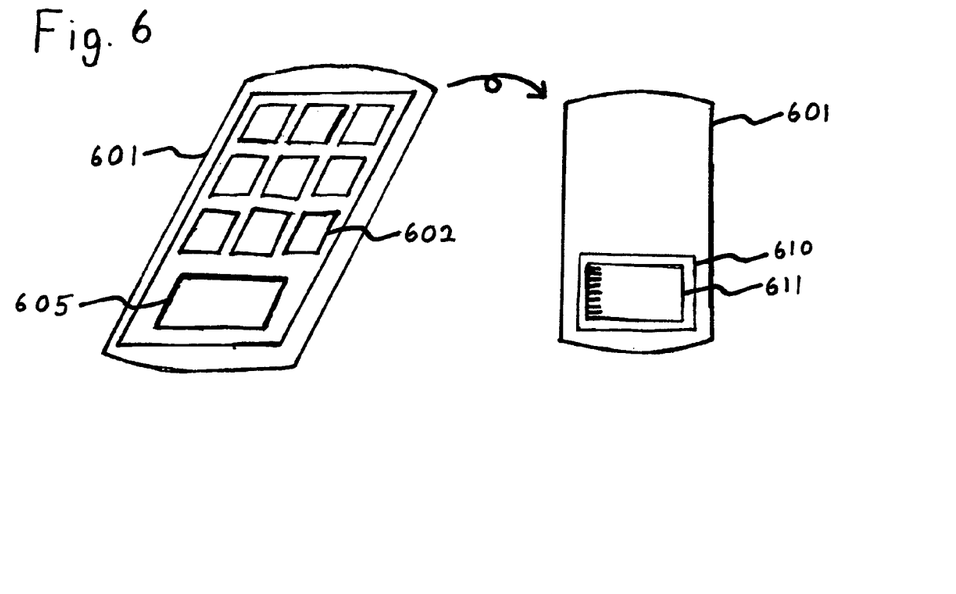
FIG. 6 provides an illustration of an embodiment of the invention in which a handheld computing device is driven by interchangeable operating system modules.

Another exemplary embodiment of the invention is illustrated in FIG. 6, which shows smart phone 601, with various touch-based visual application icons or functional buttons 602 and optionally a mechanical button 605. While all smart phones store data pertaining to subscribed services and data connectivity to various carriers on a SIM card, which can easily be exchanged to make the smart phone 601 operable in another country or with another carrier, this notion is extended according to the invention by moving more of the processing power of the smart phone 601 onto a "brain card" 611, which is seated in an appropriate slot 610 in the same way as SIM cards have been used in the art heretofore. Because of rapid reductions, achieved in the art, in size and power consumption of microprocessors designed for mobile phones, and because of the equally rapid expansion in processing power of those same microprocessors, it is now possible to place a more substantial data store (compared to what is stored today on SIM cards) along with an actual microprocessor, on "brain card" 611. Referring to the block diagram in FIG. 6, brain card 611 interacts with firmware 621 stored integrally in smart phone 601. When a brain card 611 is loaded into smart phone 601 and smart phone 601 is booted up, firmware 621 initially queries a fixed address on brain card 611 to identify and load a mobile operating system stored as data on brain card 611. This is similar to what happens in traditional personal computers with BIOS chips. After the operating system boots up, it interacts through firmware 621 with onboard smart phone systems for telephony 625, radio operations 630 (for example to connect via mobile telephony networks), audio 624, storage media 623, and graphics 622, thus enabling a portable card (brain card 611) to drive a powerful smart phone 601, in turn allowing users to turn a smart phone using one operating system quickly and easily into a smart phone using a different operating system. Since personal data could optionally be stored on the phone's storage subsystem 623 or on brain card 611, personal settings could be set for a particular phone or for a particular operating system regardless of which computing device is being driven. For example, if a business person travels to Europe with a smart phone 601 capable of handling European carrier standards, by switching brain card 611 the traveler would be able to instantly operate at full capability, and could if desired use an operating system designed to work well in Europe with the carriers and applications in dominant use there.

What is claimed is:

1. A handheld laptop computing device with a removable central processor module, comprising:

a first plurality of user interface elements comprising at least a screen, a keyboard, and a pointing device;

a first communications link software module resident in a read-only firmware memory chip;

a first docking port located on an interior surface of a void extending inward from one of the exterior surfaces of the handheld laptop computing device; and a user-removable processing unit comprising at least a central processor module, a data storage module, a second communications link software module, a second docking port, and a second plurality of user interface elements, the user-removable processing unit being removably coupled to the handheld laptop computing device via connection between the first docking port and the second docking port and adapted to be removable while running;

wherein upon removal from the handheld laptop computing device while running, the removable central processor module retains complete state information without user action and the handheld laptop computing device returns to its original state and retains no user information;

wherein all application processing carried out by the handheld laptop computing device beyond that carried out by the firmware-resident first communications link software module and optionally a firmware-resident browser is provided by the user-removable processing unit;

wherein the first communications link software module and the second communications link software module are adapted to exchange digital information between the user interface elements and the user-removable processing unit;

wherein, when the first and second docking ports are joined, the smart phone acts as a two-dimensional trackpad user interface element for the handheld laptop computing device;

wherein when the first and second communications link software modules are exchanging digital information, user actions taken via the first plurality of user interface elements are carried out by software operating on the user-removable processing unit;

wherein all user-specific information used by the handheld laptop computing device is stored on the user-removable processing unit; and wherein the user-removable processing unit is a smart phone.

2. The device of claim 1, wherein the first and second communications link software modules communicate via an electronic connection established by the joined first and second docking ports.

3. The device of claim 1, wherein the smart phone further comprises a removable processor card, the user-removable processing unit containing at least an operating system and user-specific data.

* * * * *